United States Patent [19]
Bur et al.

[11] Patent Number: 5,788,374
[45] Date of Patent: Aug. 4, 1998

[54] METHOD AND APPARATUS FOR MEASURING THE TEMPERATURE OF A LIQUID MEDIUM

[75] Inventors: Anthony J. Bur, Rockville; Kalman Migler, Gaithersburg, both of Md.

[73] Assignee: The United States of America as represented by the Secretary of Commerce, Washington, D.C.

[21] Appl. No.: 662,030

[22] Filed: Jun. 12, 1996

[51] Int. Cl.[6] .................................................. G01K 11/20
[52] U.S. Cl. .................................... 374/161; 374/137
[58] Field of Search ............................... 374/17, 110, 120, 374/121, 130, 131, 137, 139, 161, 162; 73/292; 250/338.1, 338.5, 459.1, 483.1, 484.2; 356/43, 318

[56] References Cited

U.S. PATENT DOCUMENTS

| | | | |
|---|---|---|---|
| 3,544,710 | 12/1970 | Poos | 374/137 |
| 3,565,780 | 2/1971 | Lino | 260/79.5 |
| 3,912,928 | 10/1975 | Rush et al. | 250/302 |
| 4,075,493 | 2/1978 | Wickersheim | 250/461 R |
| 4,215,275 | 7/1980 | Wickersheim | 250/459 |
| 4,288,159 | 9/1981 | Newman | 374/161 |
| 4,529,306 | 7/1985 | Kilham et al. | 356/237 |
| 4,613,237 | 9/1986 | Melton | 374/162 |
| 4,651,011 | 3/1987 | Ors et al. | 250/459.1 |
| 4,707,147 | 11/1987 | Aoki et al. | 374/161 |
| 4,707,148 | 11/1987 | Richmond | 374/137 |
| 4,710,033 | 12/1987 | Hirano et al. | 374/161 |
| 4,759,033 | 7/1988 | Ariessohn | 374/161 |
| 4,764,023 | 8/1988 | White et al. | 374/29 |
| 4,804,274 | 2/1989 | Green | 374/17 |
| 4,807,264 | 2/1989 | Kirchhofer et al. | 374/161 |
| 4,819,658 | 4/1989 | Kolodner | 128/736 |
| 5,037,763 | 8/1991 | Petisce | 436/172 |
| 5,151,748 | 9/1992 | Bur et al. | 356/32 |
| 5,158,720 | 10/1992 | Levy | 264/21 |
| 5,198,871 | 3/1993 | Hill, Jr. et al. | 356/318 |
| 5,211,480 | 5/1993 | Thomas et al. | 374/161 |
| 5,329,127 | 7/1994 | Becker et al. | 250/459.1 |
| 5,384,079 | 1/1995 | Bur et al. | 264/21 |
| 5,585,914 | 12/1996 | Yamasaki et al. | 374/161 |

OTHER PUBLICATIONS

Loutfy and Arnold, "Effect of Viscosity and Temperature on Torsional Relexation of Molecular Rotors," *J. Phys. Chem.*, 86:4205–4211 (1982).

Bur and Wang, "In–Line Optical Monitoring of Polymer Injection Molding," *Polymer Eng. Sci.*, 34:671–679 (1994).

Wang et al., "Novel Fluorescence Method for Cure Monitoring of Epoxy Resins," *Polymer*, 27:1529–1532 (1986).

Zachariasse et al., "Intramolecular Excimer Formation with 1,3–Di(1–pyrenyl)propane. Decay Parameters and Influence of Viscosity," *J. Am. Chem. Soc.*, 106:1045–1051 (1984).

*Primary Examiner*—G. Bradley Bennett
*Attorney, Agent, or Firm*—Leydig, Voit & Mayer, Ltd.

[57] ABSTRACT

A method and apparatus for measuring the temperature of a liquid medium are disclosed. In accordance with the present invention, a liquid medium containing a fluorescent dye is provided. The fluorescent dye is chosen to exhibit a first fluorescence intensity at a first wavelength and a second fluorescence intensity at a second wavelength, wherein the temperature of the liquid medium may be determined in accordance with a predetermined temperature function of the first fluorescence intensity and the second fluorescence intensity. The method of the invention comprises the steps of measuring the fluorescence intensities at the first and second wavelengths; and determining the temperature of the liquid medium in accordance with the predetermined temperature function. The apparatus comprises means for measuring the first and second fluorescence intensities, and means for determining the temperature of the liquid medium in accordance with the predetermined temperature function. The apparatus preferably is a confocal optical measuring device, and preferably is capable of determining a temperature profile within the liquid medium.

23 Claims, 10 Drawing Sheets

FIGURE 8
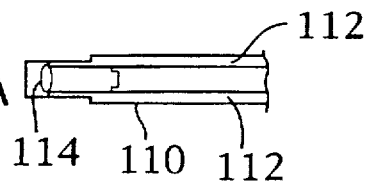
FIGURE 8A
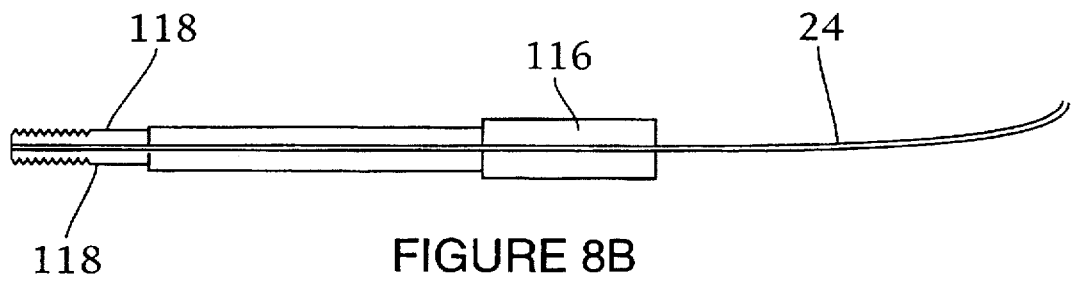
FIGURE 8B
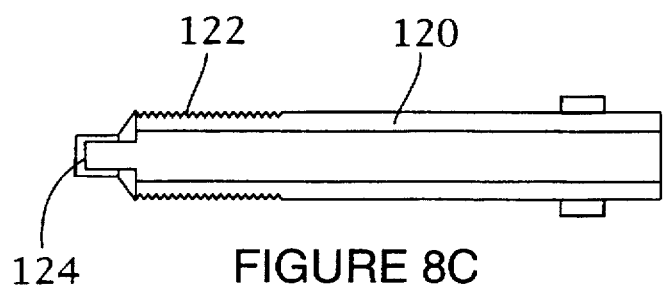
FIGURE 8C
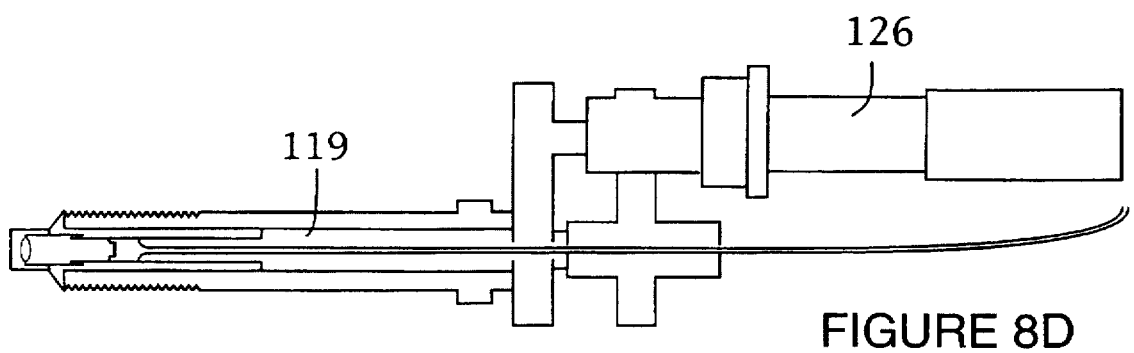
FIGURE 8D
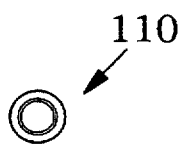
FIGURE 9A
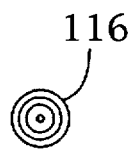
FIGURE 9B
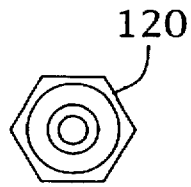
FIGURE 9C

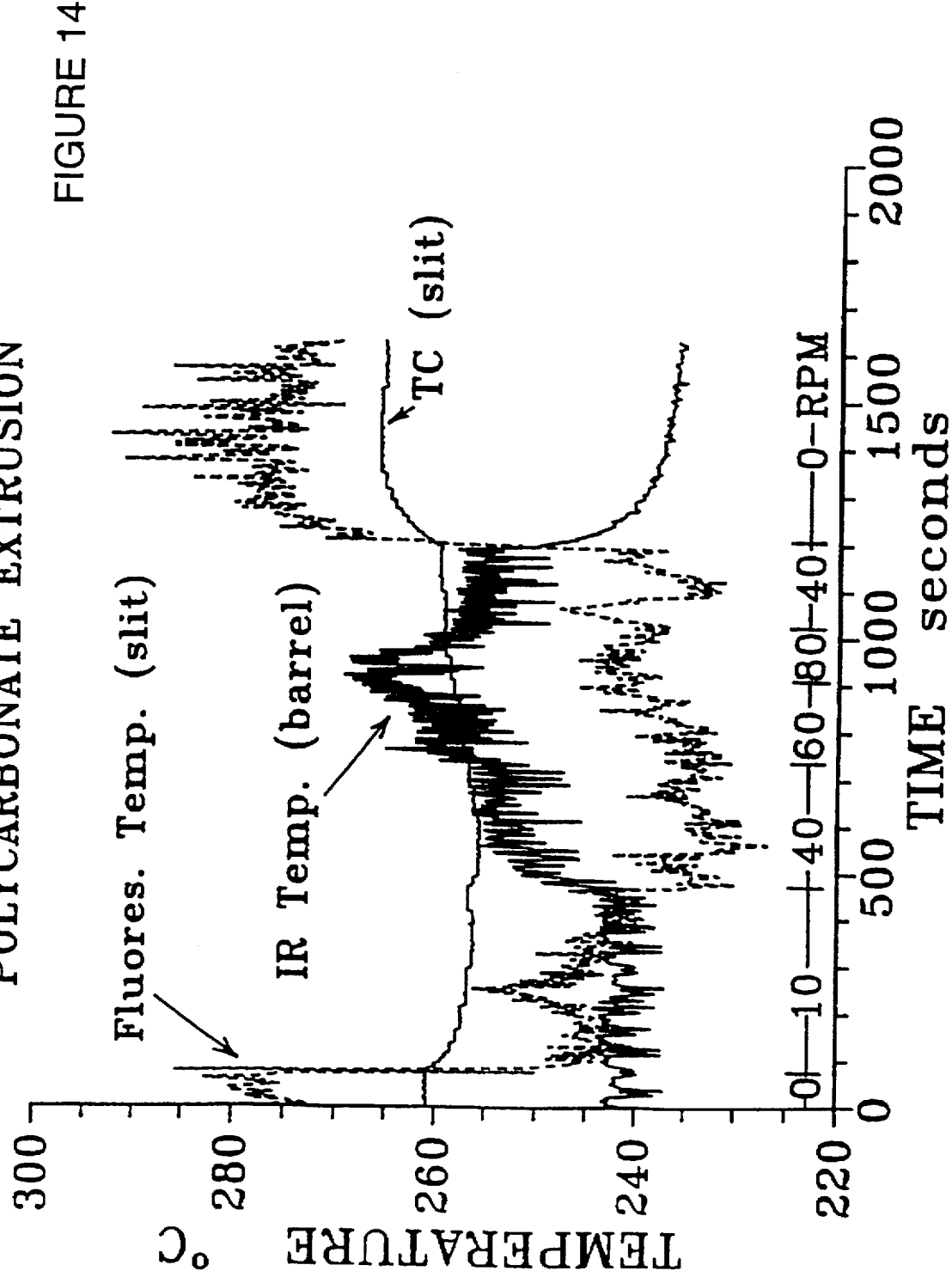

5,788,374

METHOD AND APPARATUS FOR MEASURING THE TEMPERATURE OF A LIQUID MEDIUM

TECHNICAL FIELD OF THE INVENTION

The present invention is directed towards the field of temperature measurement. More specifically, the invention is directed towards the measurement of the temperature of a liquid medium, such as a molten polymer.

BACKGROUND OF THE INVENTION

Polymeric materials, such as plastics, are widely used commercial chemical products. In typical applications, a provided base polymer is further processed, such as by extrusion, injection molding, and so forth. Typically, it is desired to melt the polymer and maintain the molten polymer at as high a temperature as possible, in order to minimize the polymer's viscosity and thereby maximize the flow throughput of the polymer. The temperature of the polymer must not be allowed to rise to a level at which the polymer degrades, however. Thus, temperature determination is considered to be one of the most critical parameters to be monitored during polymer processing.

It is often difficult to monitor the temperature of the polymer, however, even where the polymer processing machine is thermally controlled. For example, frictional forces acting within flowing polymers raise the temperature of the polymers. The heat generated by the polymer generally is not uniformly dissipated, resulting in a temperature gradient across a region of the molten polymer. This phenomenon is known as "shear heating." Conventional temperature monitoring devices such as thermocouples and resistance temperature devices generally do not accurately monitor resin temperature, especially when shear heating effects are observed. These devices determine departure of polymer temperature from machine temperature. Shear heating has a complex effect on the machine temperature, and thus conventional devices are not readily able to accurately detect the true temperature of the molten polymer.

In addition, it has been observed that the pressure within a polymeric melt can affect the measurement of the temperature of the melt. It is well known that the behavior of many materials depends upon not only the temperature of the material, but also the pressure within the material. The prior art has provided a number of methods for evaluating the properties of a liquid medium that do not account for the pressure within the liquid medium. For example, U.S. Pat. No. 5,151,748 discloses an optical sensor for the measurement of molecular orientation and viscosity in a polymer melt. In accordance with one aspect of the disclosure, a polymeric chromophore is incorporated into a polymer melt. The chromophore exhibits sensitivity to processing parameters as a result of molecular orientation of the polymer melt. By analyzing the fluorescence of the chromophore, the fluid properties of the polymer melt can be determined. U.S. Pat. No. 5,384,079 discloses a method for measuring the onset of polymer solidification. The method involves the use of a calibration relationship between the fluorescence intensity and temperature of the doped polymer to detect the onset of polymer solidification. Both of the foregoing patents disclose inventions that are highly useful in the polymer processing industry. In neither patent, however, is the measured temperature adjusted to correct for pressure changes within the molten polymer.

Moreover, it is often desirable to determine a temperature profile of a molten polymer across a region of the melt, e.g., to model thermal conditions inside of the polymer processing machine and to determine that the maximum temperature of the polymer does not exceed its degradation temperature. Conventional temperature measuring devices, however, are not readily able to determine the temperature at more than one point within a polymer processing machine. For example, IR radiometers generally cannot be used to obtain temperature profiles within a liquid medium.

It is known to evaluate the temperature within a liquid medium by evaluating phosphorescence of the liquid medium. Such methods are only marginally satisfactory for evaluating conditions in a polymer processing machine. In many polymer processing machines, the temperature within the molten polymer may fluctuate rapidly. This is especially true during the start-up or shut-down periods of the machine. Inasmuch as phosphorescence is a relatively slow phenomenon as compared to the temperature fluctuations, such methods may not be used to monitor the polymer processing machine during periods of temperature fluctuation. Moreover, concentrations as high as 10% of phosphorescent dyes typically must be used to yield a measurable light intensity. For polymers, such high dye concentration can affect the physical properties of the polymer product.

There accordingly exists a need in the art for a more accurate method for measuring the temperature of a molten polymer in a polymer processing machine. In particular, a need exists for correcting the measurement in accordance with the pressure within the molten polymer. A further need exists for a method for determining the temperature profile across a region of a molten polymer. A further need exists for determining the temperature of a liquid medium in a system that is rapidly changing. A further need exists to measure only the resin temperature of a polymeric melt, with no contribution from the temperature of the polymer processing machine. It is therefore a general object of the present invention to provide a method and apparatus for measuring the temperature of a liquid medium, such as a molten polymer, that satisfies the foregoing needs.

BRIEF SUMMARY OF THE INVENTION

The present invention satisfies the foregoing and other needs by providing a method and apparatus for determining the temperature of a medium, preferably, a liquid medium, such as a molten polymer, and by providing a method and apparatus for determining the temperature profile across a region of a liquid medium. In accordance with the present invention, a liquid medium including a fluorescent dye is provided. The dye is chosen to exhibit a first fluorescence intensity at a first wavelength and a second fluorescence intensity at a second wavelength. The dye is further chosen such that the temperature of the liquid medium may be determined as a predetermined temperature function of the first fluorescence intensity and the second fluorescence intensity. To measure the temperature of the liquid medium, the fluorescence intensities at the first and second wavelengths are evaluated, and the temperature of the liquid medium determined therefrom in accordance with the predetermined temperature function. In a preferred embodiment, the method includes the steps of determining the pressure within the liquid medium, and determining a corrected temperature in accordance with a predetermined pressure function.

The invention also encompasses an apparatus for measuring the temperature of a liquid medium having a fluorescing dye, as set forth above. The apparatus comprises means for measuring the first and second fluorescence intensities, and means for determining the temperature of the liquid medium in accordance with the predetermined temperature function. In a preferred embodiment, the apparatus includes means for determining the pressure within the liquid medium, wherein the means for calculating the temperature calculates the temperature additionally according to a predetermined pressure function.

DESCRIPTION OF THE FIGURES

FIG. 8 illustrates various portions of an apparatus in accordance with the invention, wherein:

FIG. 8A is a side plan view in partial cross section of a lens and lens holder, wherein the lens holder is in the form of a tubular housing with a threaded interior wall;

FIG. 8B is a side plan view of the common end of an optical fiber cable, illustrating an endpiece including a threaded tip for mating with the interior housing of the lens holder of FIG. 8A to form an endpiece-lens assembly;

FIG. 8C is a side plan view of the tubular housing of the preferred embodiment of the apparatus of the invention, in the form of a hollow bolt having a partially threaded exterior wall and a sapphire window;

FIG. 8D is a side plan view in partial cross section of the bolt illustrated in FIG. 8C, and further including a micrometer for translating the endpiece-lens assembly within the bolt.

FIG. 9 illustrates various portions of an apparatus in accordance with the invention, wherein:

FIG. 9A is a front plan view of the lens holder and lens shown in FIG. 8A;

FIG. 9B is a front plan view of the endpiece illustrated in FIG. 8B;

FIG. 9C is a front plan view of the tubular housing illustrated in FIG. 8C.

FIG. 14 is a graph comparatively illustrating the temperature of a polymer as measured with an IR radiometer, a thermocouple, and an apparatus in accordance with the invention.

DETAILED DESCRIPTION OF THE INVENTION

Figure 1:
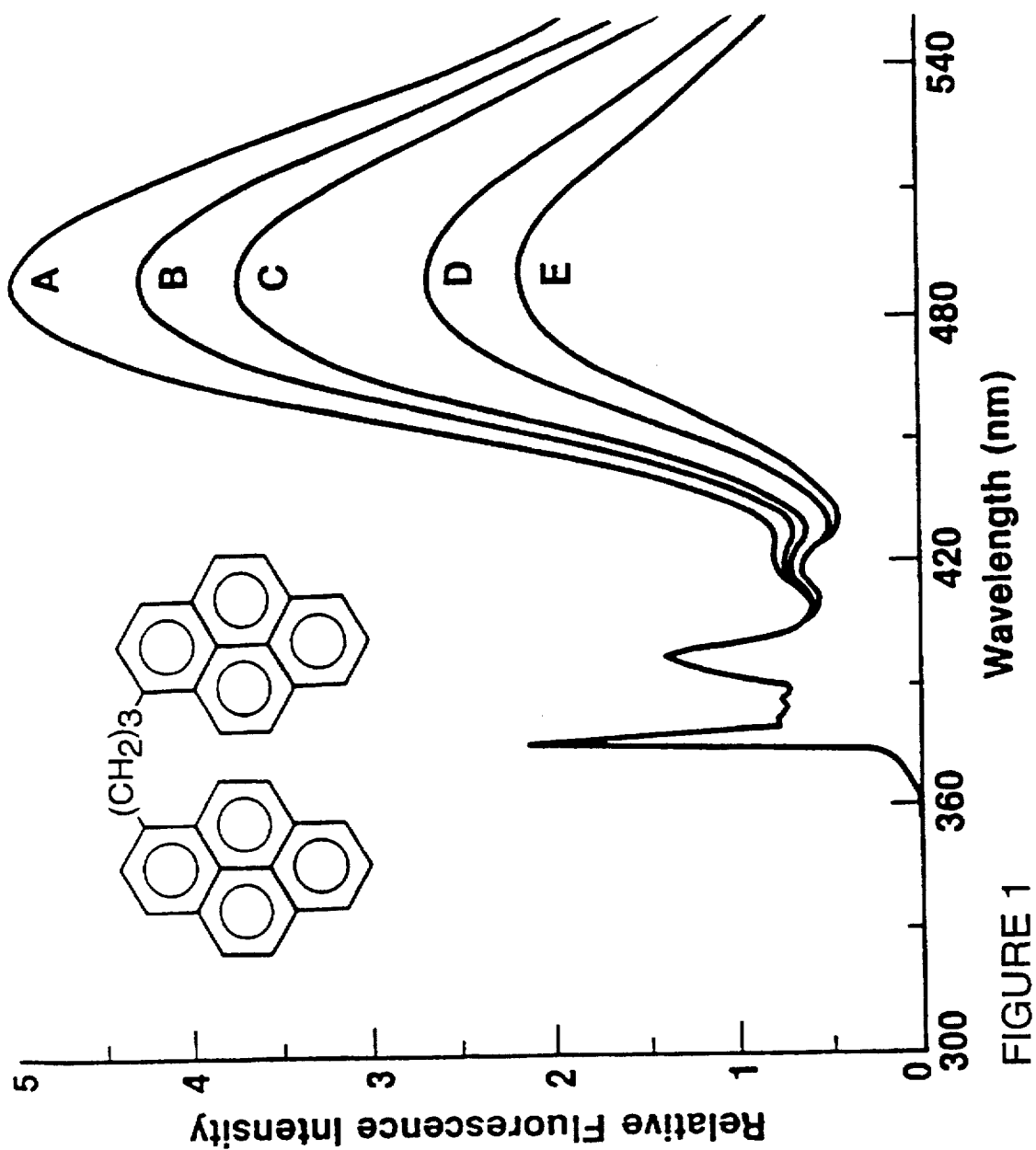
FIG. 1 is a graph of the fluorescence intensity of bis-(pyrene) propane (BPP) relative to fluorescence at 400 nm. The intensity is shown for BPP in various solvents at wavelengths from approximately 360 nm to 550 nm, illustrating the variability of the fluorescence intensity as the viscosity of the solvents is increased from A to E.

The inventors have discovered that the temperature of a liquid medium may be accurately calculated by measuring the intensity of fluorescence of a fluorescent dye. In accordance with one embodiment of the invention, a liquid medium including a fluorescing dye is provided. The temperature of the dye may be determined in accordance with a predetermined temperature function of the intensity of light fluoresced by the dye at two wavelengths. In a preferred embodiment, the method of the invention comprises the steps of measuring the fluorescence intensity at the first wavelength and the fluorescence intensity at the second wavelength; and determining the temperature of the liquid medium in accordance with the temperature function. In a more preferred embodiment, the method comprises the steps of determining the pressure within the liquid medium; and determining a corrected temperature according to a predetermined pressure function.

The scope of the invention further encompasses an apparatus for determining the temperature of a fluorescing medium. In one embodiment, the apparatus comprises means for measuring the fluorescence of the fluorescing medium at a first fluorescence intensity and a second fluorescence intensity; and means for determining the temperature of the medium in accordance with a predetermined temperature function of the first fluorescence intensity and the second fluorescence intensity. In a preferred embodiment, the apparatus further includes means for determining the pressure within the liquid medium.

The apparatus and method of the present invention preferably are used to measure the temperature of a molten polymer, such as during extrusion of the polymer. The applicability of the invention is not limited to polymeric media or to extrusion processes, however, and indeed the apparatus and method of the invention may be used to measure the temperature of any liquid medium to which a fluorescent dye may be added. Preferably, the liquid medium is relatively transparent or translucent to light at the wavelengths used in conjunction with the invention. For such liquids, light may be focused to and returned from various points within the liquid medium without the need to extend instrumentation into the liquid medium. Examples of such liquids include molten polyethylene and molten polypropylene, polystyrene, and poly(ethylene terephthalate).

In accordance with the invention, a fluorescent dye whose fluorescence is variable as a function of temperature is chosen. Any fluorescent species whose fluorescence varies as a function of temperature may be considered a "fluorescent dye" within the scope of the present invention. Advantageously, benzoxazolyl stilbene (BOS) (Aldrich Chemical Co.), bis-(pyrene) propane (BPP) (Molecular Probes, Inc.), perylene (Aldrich Chemical Co.) bis-terbutylphenyl perylenedicarboximide (Aldrich Chemical Co.), anthracene, diphenyl hexatriene, diphenyl carbazole, and bis-(phenyl) benzene may be used in conjunction with the invention. The choice of dye may be dictated by various considerations, such as temperature, dye sensitivity, and cost. For example, perylene and BOS are the least expensive among the foregoing dyes.

The dye may be incorporated into the polymeric medium in any amount that allows the temperature to be determined in accordance with the methods and apparatus described herein. Surprisingly, it has been found that such dyes may be incorporated at low concentrations, preferably, at concentrations of from about 0.1 to 10 parts per million by weight, more preferably at 1 part per million by weight. The dyes may affect the color of the polymer medium, but, at the low concentrations which are used, they generally do not affect other physical properties.

One example of a dye that may be useful in the present invention is BPP. The structure of BPP is shown below:

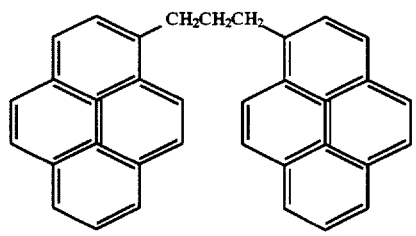

As illustrated, the molecule comprises a straight-chain propane backbone including two aromatic pyrene rings. The two pyrene rings may rotate about the propane linkage. When the rings have rotated to a position in which they overlap, the BPP molecule may be said to be in an excimer state. In such state, energy may be transferred between the rings. The rotation of the pyrene rings, and thus the formation of the excimer state, is dependent upon the viscosity of the medium in which the BPP is dissolved and the temperature of the BPP.

FIG. 1 graphically illustrates the effect of viscosity on the fluorescence of BPP. All of the data shown in FIG. 1 are normalized with respect to the fluorescence at 400 nm. This figure shows the measurement of the ratio of excimer to monomer intensities. High viscosity media reduce the rate of formation of the excimer state, thus indicating that more monomer decay is obtained in high viscosity media.

Figure 2:
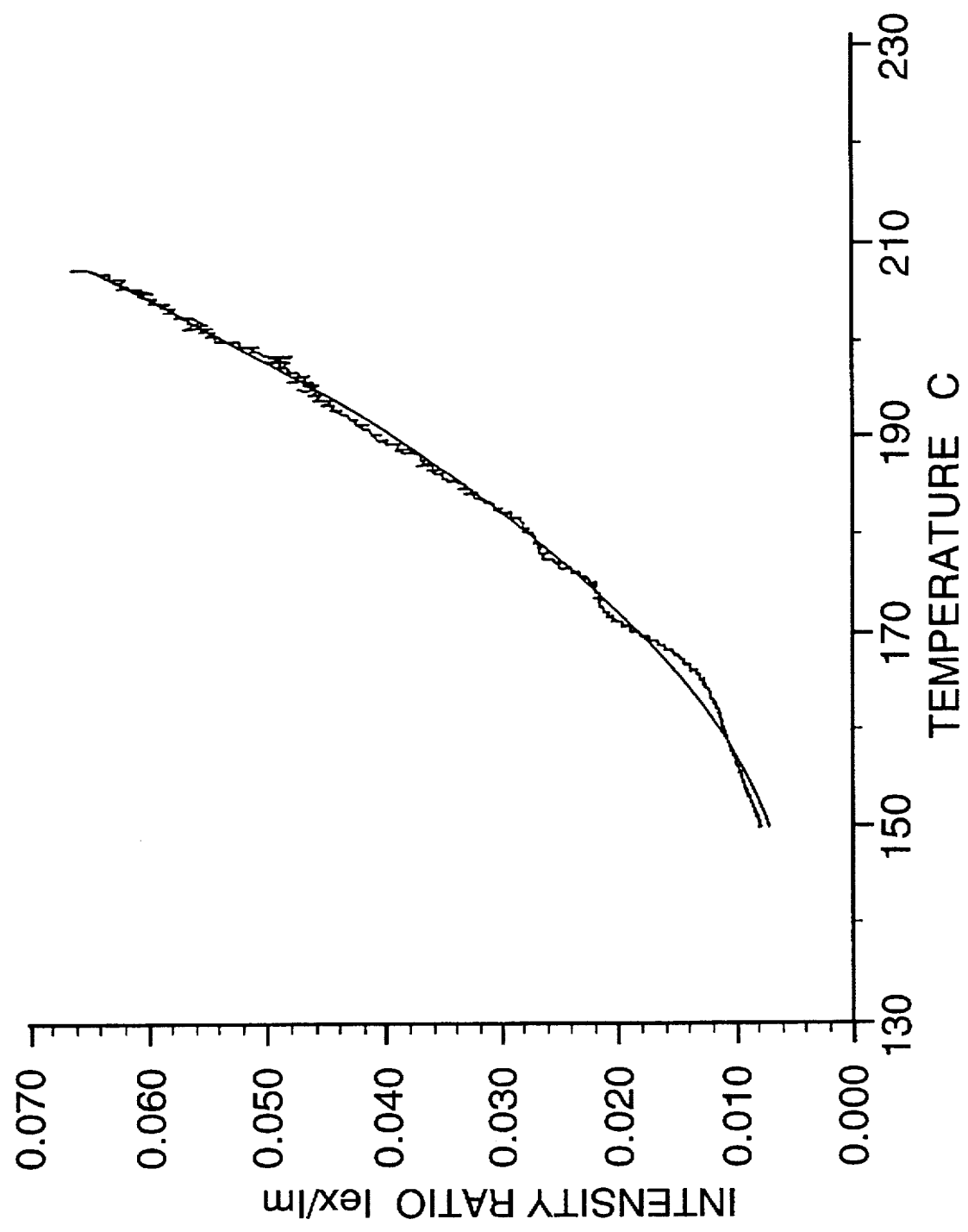
FIG. 2 is a graph of the temperature function of the fluoresced light intensity of BPP in methyl methacrylate/methacrylic acid copolymer (85:15). More specifically, the ratio of the intensity of fluoresced light of the BPP excimer to the intensity of light fluoresced by the BPP monomer varies according to the illustrated curve.
Figure 3:
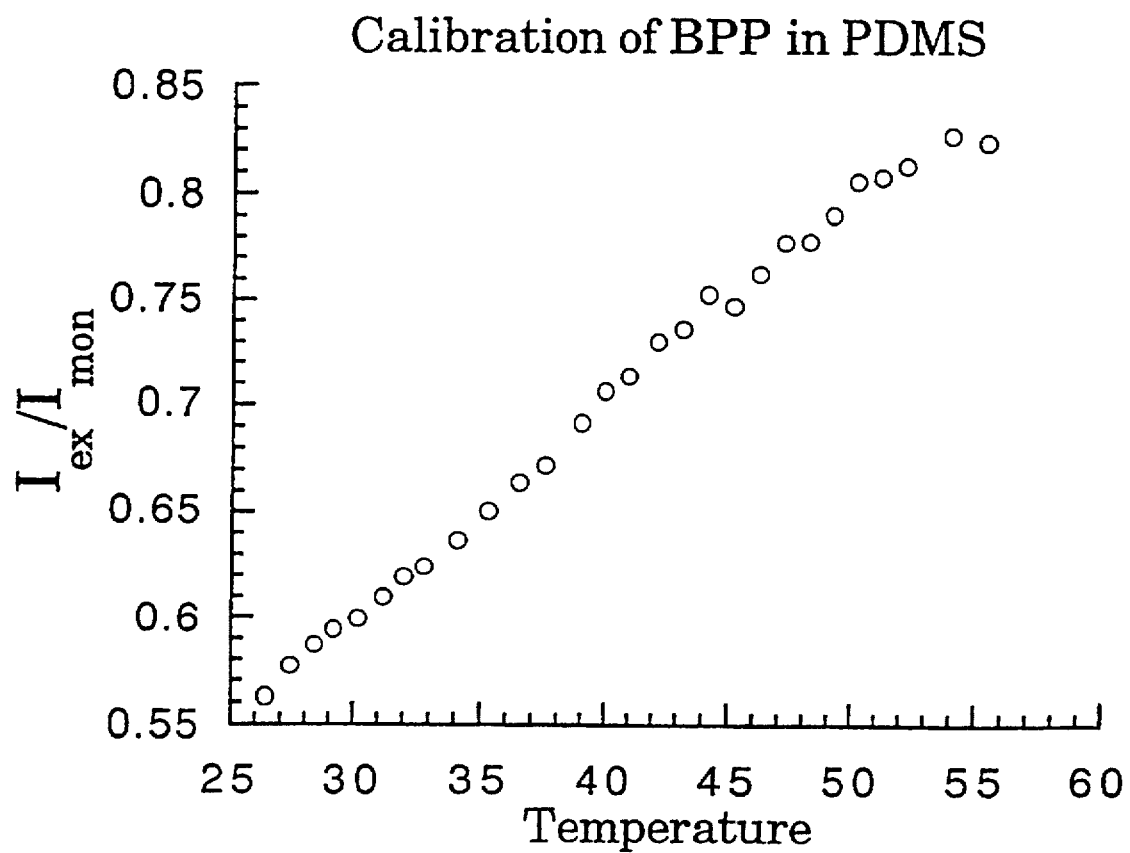
FIG. 3 is a graph of the temperature function of the fluoresced light intensity of BPP in polydimethylsiloxane (PDMS).

In accordance with the preferred embodiment of the invention, the fluorescence of the BPP excimer at 525 nm is evaluated in comparison to that of the BPP monomer at 400 nm. Under conditions of shear flow, the state of the dye and polymeric resin medium may not be uniform, and the local concentration of dye may fluctuate. By calculating the temperature based on a ratio of intensities, the variability of the measured intensity as a function of concentration fluctuations may be eliminated. FIG. 2 illustrates the correlation between the ratio of the intensities of the BPP excimer to the BPP monomer and the temperature of the liquid medium. This Figure illustrates the ratio for BPP in a methyl methacrylate/methacrylic acid copolymer (85:15). This calibration curve was obtained in accordance with Example 1.

as set forth below. Similarly, FIG. 3 illustrates a calibration curve obtained by doping polydimethylsiloxane (PDMS) resin with BPP in accordance with Example 2, as set forth below.

Another exemplary fluorescent dye that may be advantageously used in conjunction with the invention is perylene. Perylene has the following structure:

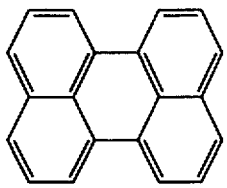

Perylene is preferred to BPP at temperatures greater than about 220° C. At such temperature levels, BPP begins to thermally degrade. The thermal degradation temperature of perylene is higher, and this molecule has been observed to be satisfactory at temperatures up to about 300° C. At temperatures below about 220° C., the fluorescence of BPP has a higher temperature sensitivity, and thus BPP is preferred at these temperatures.

Figure 4:
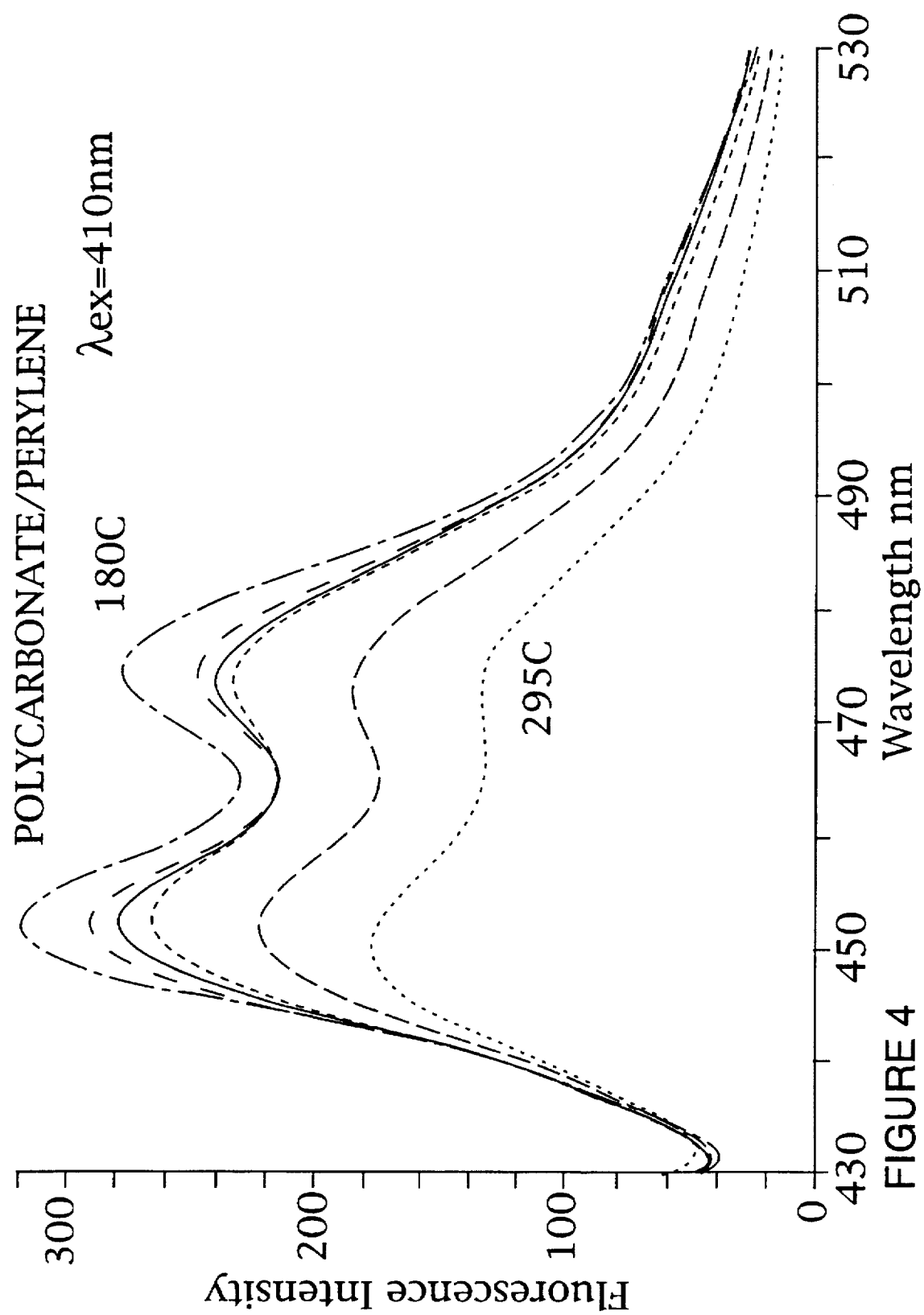
FIG. 4 is a graph of the fluorescence intensity of perylene in polycarbonate at wavelengths from approximately 430 nm to 530 nm, illustrating the variability of the fluorescence intensity as temperature is increased from 180° C. to 295° C.

FIG. 4 illustrates the temperature dependence of the fluorescence of perylene in polycarbonate resin. As illustrated, a relatively maximum fluorescence intensity is observed at a wavelength of 473 nm and a relatively minimum fluorescence intensity is observed at a wavelength of 464 nm. The differential between these relative intensities becomes smaller as the temperature is increased.

While it is not intended to limit the invention to a particular theory, it is believed that this diminishing differential is a result of the phenomenon of fluorescence band broadening. At room temperature, relative maxima are observed at 453 nm and 473 nm. These peaks overlap, such that the minimum at 464 nm is non-zero. As the temperature increases, the population distribution of energy levels in each band changes according to the Boltzman distribution factor, creating increased populations at higher energy levels. In addition, at high temperatures a larger portion of energy absorbed by the perylene molecule is dissipated via nonradioactive decay, such as molecular vibrations and rotational motion. Fluorescence band broadening is caused by a combination of the Boltzman factor population distribution and the temperature dependence of the nonradiative decay. As a result, the minimum at 464 nm becomes relatively shallower with increasing temperature.

Figure 5:
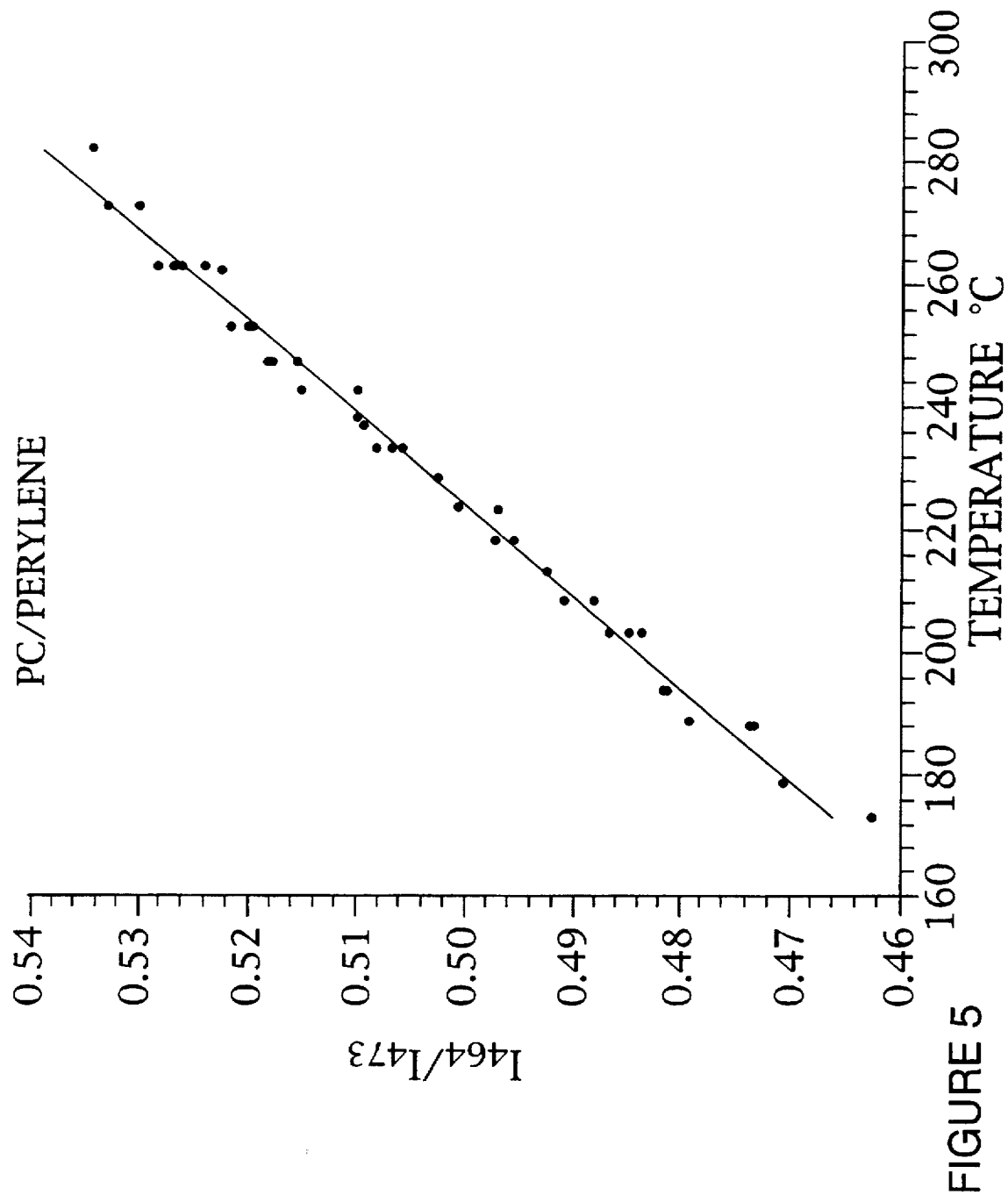
FIG. 5 is a graph of the temperature function of the fluoresced light intensity of perylene in polycarbonate. More specifically, the ratio of light fluoresced at 464 nm to light fluoresced at 473 nm varies according to the illustrated curve.

By comparing all of the fluorescence intensities for a number of wavelength pairs and correlating these ratios to temperature, it has been found that, when perylene is chosen as the fluorescent dye, greatest accuracy can be attained when the ratio of fluoresced intensity at 464 nm to that at 473 nm is correlated to temperature. The perylene wavelengths used in the ration, 464 and 473 nm, may be used in all polymer systems. However, the calibration curve is expected to be different for each polymer. Of course, other pairs of wavelengths may be used to evaluate the temperature. In some aspects of the invention, the intensities at both of the wavelengths will vary as a function of temperature, due to such fluorescence band broadening or other phenomena. FIG. 5 illustrates a calibration curve obtained for perylene in polycarbonate in accordance with Example 3, as set forth below. The calibration curve correlates the ratio of the intensity of light obtained at 464 nm to that obtained at 473 nm to the temperature of the polycarbonate.

The calibration curve for perylene doped into polycarbonate was calculated as a linear, whereas that for BPP in poly(methyl methacrylate)/polymethacrylic acid copolymer was calculated as a quadratic curve. BPP is a much larger molecule than perylene. In its motion, BPP sweeps out a large volume, thus creating intimate interaction with the polymer host molecule and adopting long-range macromolecular dynamics of the resin. The polycarbonate resin was near its glass transition temperature of 110° C. At temperatures immediately above the glass transition temperature, quadratic dependence of molecular dynamics as a function of temperature is typically observed. Because perylene is a smaller molecule, it interacts with the polymer at a strictly local level, i.e., not at the macromolecular polymer level. Accordingly, the calibration curve may be approximated as a linear curve for perylene.

Another fluorescent dye that exhibits fluorescence band broadening is benzoxazolyl stilbene. Benzoxazolyl stilbene has the following formula:

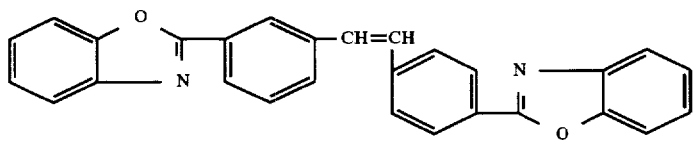

This compound has three pairs of fluorescence wavelengths at which the intensity of fluoresced light desirably may be measured: 423 nm and 433 nm; 439 nm and 451 nm; and 451 nm and 467 nm. Preferably, the intensity of light is measured at 423 nm and 433 nm.

In accordance with the invention, the temperature variability of the light intensities at the chosen wavelengths as a function of the temperature of the liquid medium is determined. The function may be determined by, for example, measuring the fluorescence intensities at the wavelengths in question for a sample of known temperature. A ratio of the intensities may be determined, and the numeric ratio correlated to the temperature of the sample. The temperature of the sample then may be increased by a few degrees, and the intensities again measured and correlated to temperature. Conventional statistical techniques then may be used to fit an approximated curve to the data obtained. It should be noted that the calibration curves shown in FIGS. 2, 3, and 5 are dependent upon the light throughput and sensitivity of the equipment used by the inventors. Accordingly, in a preferred embodiment of the present invention, a calibration curve of intensity ratio as a function of temperature should be determined before measuring the temperature of the molten polymer under processing conditions. Once the temperature function of the fluorescence is determined, the same equipment should be used under processing conditions.

In accordance with a preferred embodiment of the invention, the fluorescence-calculated temperature of the molten polymer or other liquid medium is corrected in accordance with a predetermined pressure function. Pressure within the liquid medium may be variable, for example, as the rotational speed of the screw of an extruder is increased. The inventors have observed that the effects of pressure within the liquid medium may be approximated in accordance with a pressure function. In some instances, the pressure correction factor is linear, that is, the temperature calculated by fluorescence measurements in accordance with the invention should be corrected by adding a pressure correction factor that generally increases as the pressure within the liquid medium increases. The pressure correction factor is expected to be linear in most cases. The temperature thus is determined according to the following equation:

$$T = T_{calc} + PCF * \text{gauge pressure}$$

wherein T is the temperature of the liquid medium, $T_{calc}$ is the temperature calculated by fluorescence measurements, and PCF is the pressure correction factor.

The pressure correction factor may be determined, for example, by measuring the temperature within an extruder by infrared radiometry, and comparing the IR-measured temperature to that obtained by fluorescence measurements. A function, such as a linear function, then may be fit to the data obtained. For BPP in poly(methyl methacrylate)/polymethacrylic acid copolymer, the pressure correction factor has been found to be 2.8° C. per 6.895 MPa (1000 psi). For perylene in polycarbonate, the pressure correction factor is 14.8° C. per 6.895 MPa (1000 psi). For BOS in polycarbonate, a linear pressure correction factor has been found to be 10° C. per 6.895 MPa (1000 psi). These values are not expected to be dependent upon the equipment used to determine the fluorescence-calculated temperature, but will be dependent upon the liquid medium in which the fluorescent dye is disposed in accordance with compressibilty of the medium. The pressure correction factor can also be obtained using a fluorescence pressure cell with which fluorescence can be measured for a range of temperatures and pressures.

In accordance with one embodiment of the invention, a temperature profile within the liquid medium is determined. For example, using the methods set forth above, the temperature of the liquid medium may be taken at two points along the region to thereby determine a one-dimensional temperature profile along the region. If a more detailed one-dimensional profile is desired, the temperature may be determined along three or more collinear points within the liquid medium.

A two- or three-dimensional temperature profile also may be determined along a region within the liquid medium. To determine a two-dimensional temperature profile, for example, the temperature may be measured at three non-collinear points. Preferably, the temperature is measured at several coplanar points along the two-dimensional region, to thereby obtain a more detailed temperature profile. To determine a three-dimensional temperature profile, the temperature is measured at at least four non-coplanar points.

Figure 6:
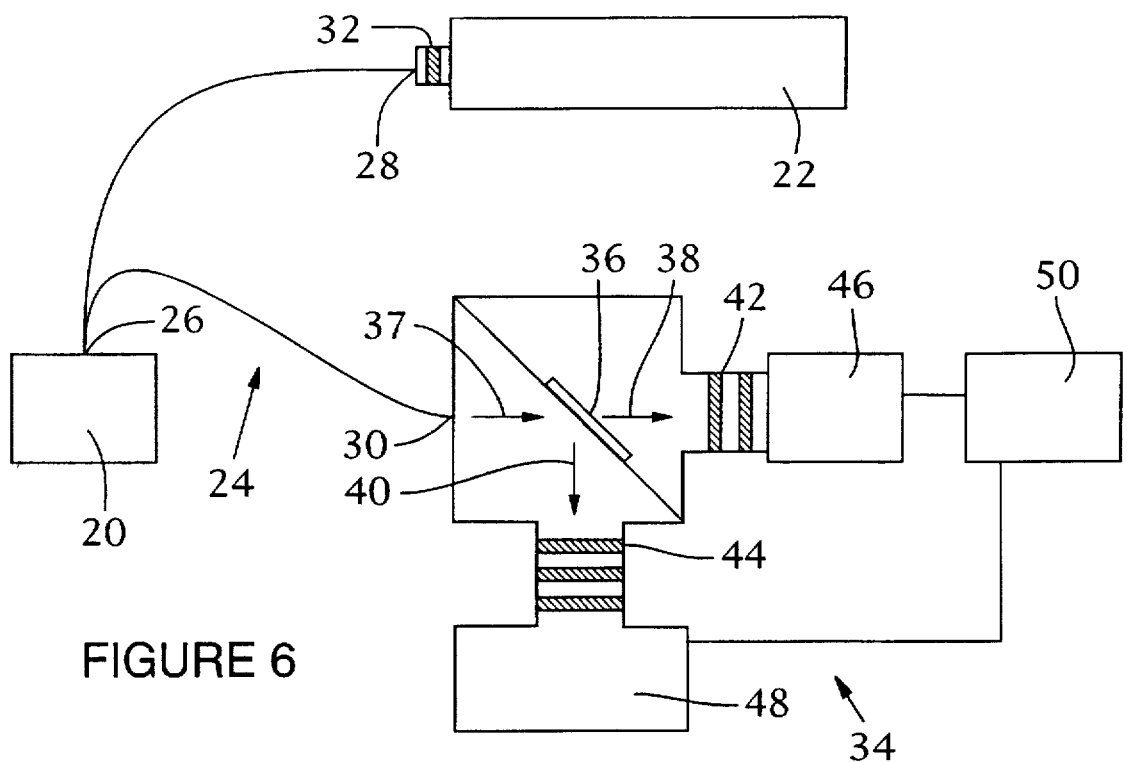
FIG. 6 is a schematic illustration of an apparatus in accordance with the invention, illustrating in detail a means for measuring the intensities of fluoresced light at two wavelengths.

The present invention also encompasses an apparatus for determining the temperature of a liquid medium. FIG. 6 schematically illustrates one such apparatus in accordance with the invention. The molten polymer is contained within a polymer processing machine 20, which may be, for example, an oven, an extruder, mixer, injection molding machine, or a polymerization reactor. Excitation light is generated by a light source 22, which may be, for example, a xenon arc lamp. A preferred light source is xenon arc lamp model 66006 sold by Oriel Corporation. Other light sources may be used, and indeed it is contemplated that any light source capable of generating light at a wavelength sufficient to excite the fluorescent dye may be used.

The light source 22 is disposed in a light-communicating relationship with an optical fiber cable for transmitting light into the polymer processing machine 20. Preferably, the optical fiber cable is a bundled bifurcated optical fiber cable 24, as illustrated in FIG. 6. The cable 24 has a common end 26 and two bifurcated ends 28, 30. The common end 26 is disposed in a light-communicating relationship with the molten polymer, such that light from the light source 22 may be transmitted via one of the bifurcated ends 28 to the molten polymer and light fluoresced by the molten polymer may be returned via the other bifurcated end 30. Such a bundled optical fiber cable may be prepared from commercially available cable, such as that sold by Electrofiber Optics.

The excitation light may be passed through a filter 32 so that only light of the correct wavelength is transmitted to the polymeric medium. The excitation light will have a shorter wavelength than the light fluoresced by the fluorescent dye, and thus the measured intensities will not need to be corrected to account for the intensity of the excitation light.

The fluoresced light is returned to an intensity-measuring device 34, which is disposed in a light-communicating relationship with the bifurcated end 30 and which measures the intensity of light returned at the two wavelengths to be evaluated. In a preferred embodiment, the intensity-measuring device 34 comprises a wavelength-insensitive beam splitter 36, which divides a beam of incoming light 37 from the bifurcated end 30 of the optical fiber cable 24 into two divided beams 38, 40. A suitable beam splitter is sold by Oriel Corporation. Also preferred is a dichroic mirror, such as that sold by Omega Optical Corporation. The divided beams 38, 40 pass through filters 42, 44, wherein only light of the desired wavelength is allowed to pass. For example, if the fluorescent dye is perylene, one of the filters 42 would pass light at 473 nm and the other filter 44 would pass light at 464 nm. Suitable light filters may be obtained from Andover Corporation. If desired, plural filters may be used to block excitation light that is returned to the detector.

The filtered beams pass into photomultiplier tubes 46, 48, wherein an electrical signal whose strength corresponds to the intensity of the beam is generated. Suitable photomultiplier tubes may be obtained from Hamamatsu Corporation. The electrical signals are measured by a two-channel photon counter 50 to thereby measure the intensity of the light at the frequencies of interest. A suitable photon counter can be obtained from Stanford Research Systems Inc. The counter may or may not be integrated with the computer. For example, the counter may be in the form of a card which is positioned inside the computer cabinet.

It should be understood that the value obtained for the intensity of light, as measured by the intensity-measuring device described above, will differ from the "true" or actual intensity of light fluoresced by the fluorescent dye. This is because some losses will be incurred as the light passes through the fiber optic cable and through the beam splitter, and it is noted that, for example, the light intensity will be reduced by one-half if the beam is evenly split by a wavelength insensitive beam splitter. Nonetheless, for purposes of the present invention, the measurement of the reduced light intensity (that is, the intensity of the light as reduced by the operation of transmitting the light through the fiber optic cable and beam splitter) should be considered to be measurement of the intensity of fluoresced light. It is contemplated that other means may be used to directly determine the intensity of light fluoresced by the dye, that is, without determining a reduced intensity. Such other means or method step also should be considered to fall within the purview of the present invention. It is only necessary that the measured intensity at the wavelengths of interest should be related as a function of the temperature of the liquid medium.

Figure 7:
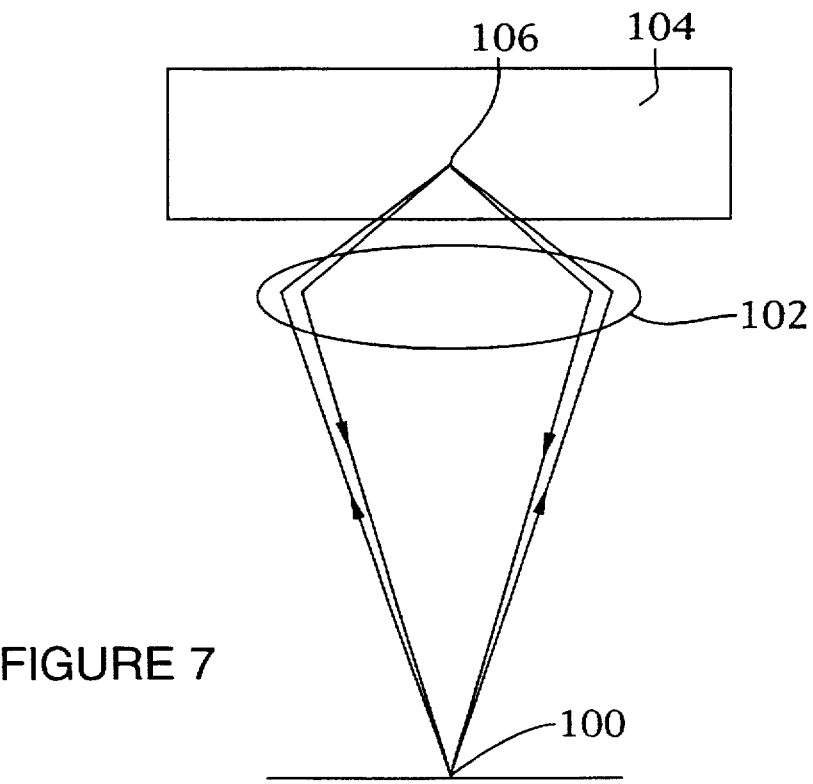
FIG. 7 is a schematic illustration of an idealized pinhole-lens arrangement, illustrating the principle of confocal optical sectioning.

In FIG. 7, the principle of confocal optical sectioning is illustrated. In accordance with this principle, the intensity of light may be determined at a single, relatively precisely located point within a transparent or translucent liquid medium. Excitation light is provided from a pinhole light source 100. The pinhole light source may comprise the tip of a bundled optical fiber cable. The light is passed through a lens 102 and into the medium 104 to be evaluated.

The light is focused at a point 106 within the liquid medium, whereby it excites the fluorescent dye within the liquid medium. The dye fluoresces, emitting light in all directions. Excitation light further causes fluorescence at other points within the liquid medium. However, only light fluoresced from the focal point 106 is returned to the pinhole 100 in significant amounts. For a fluorescent photon created at other points in the liquid medium, the probability of it hitting the pin hole decreases sharply as a function of distance from the focal point. Accordingly, a measurement of the temperature of the liquid medium at a single point may be made.

FIGS. 8 and 9 illustrate portions of an apparatus in accordance with the preferred embodiment of the invention. The apparatus includes a lens holder 110 having a partially threaded interior wall surface 112. The lens holder 110 preferably is in the form of a darkened tubular housing, allowing light to pass through the lens holder 110 and through the lens 114. As shown in FIG. 8B, the common end of the optical fiber cable 24 terminates in an endpiece 116, which preferably is in the form of a tubular housing. The endpiece 116 has a threaded tip, or exterior wall surface 118 for mating with the lens holder 110 to form an endpiece-lens assembly 119.

In FIG. 8C, the housing of the apparatus of the invention is illustrated. In the preferred embodiment of the invention, the housing 120 is in the form of a hollow bolt having at least a partially threaded exterior wall surface 122. Preferably, the bolt has a ½ inch nominal diameter and a length of approximately 3½ inches, so that it may fit into a standard instrumentation port in a polymer processing machine. The housing 120 terminates in a sapphire window 124 to prevent the endpiece-lens assembly 119 from coming into contact with the liquid medium. In accordance with the invention, the endpiece-lens assembly 119 may be translated within the housing 120. The lens is chosen to have a focal length of approximately 5 mm, such that the focal point of the lens will be beyond the sapphire window 124 and within the liquid medium. Preferably, the apparatus includes a micrometer 126 to allow for precise translation of the endpiece-lens assembly 119 within the housing 120. The micrometer may be a hand-operated or motorized micrometer. By translation of the endpiece-lens assembly 119 within the housing 120, the focal point of the lens may by moved radially into or out of the extruder, as desired. The various components of the appparatus are further illustrated in FIGS. 9A–9C.

The apparatus may be calibrated as follows. Using the micrometer, the endpiece-lens assembly is adjusted such that it contacts the sapphire window. This establishes the farthest distance into the polymer sample that a temperature reading can be made. The actual focal length then is determined. As the distance between the front window and the focusing lens is increased by retraction of the endpiece-lens assembly, the point of measurement moves closer to the bolt at a rate equal to the window-to-lens distance times the average refractive index of the medium.

Figure 10:
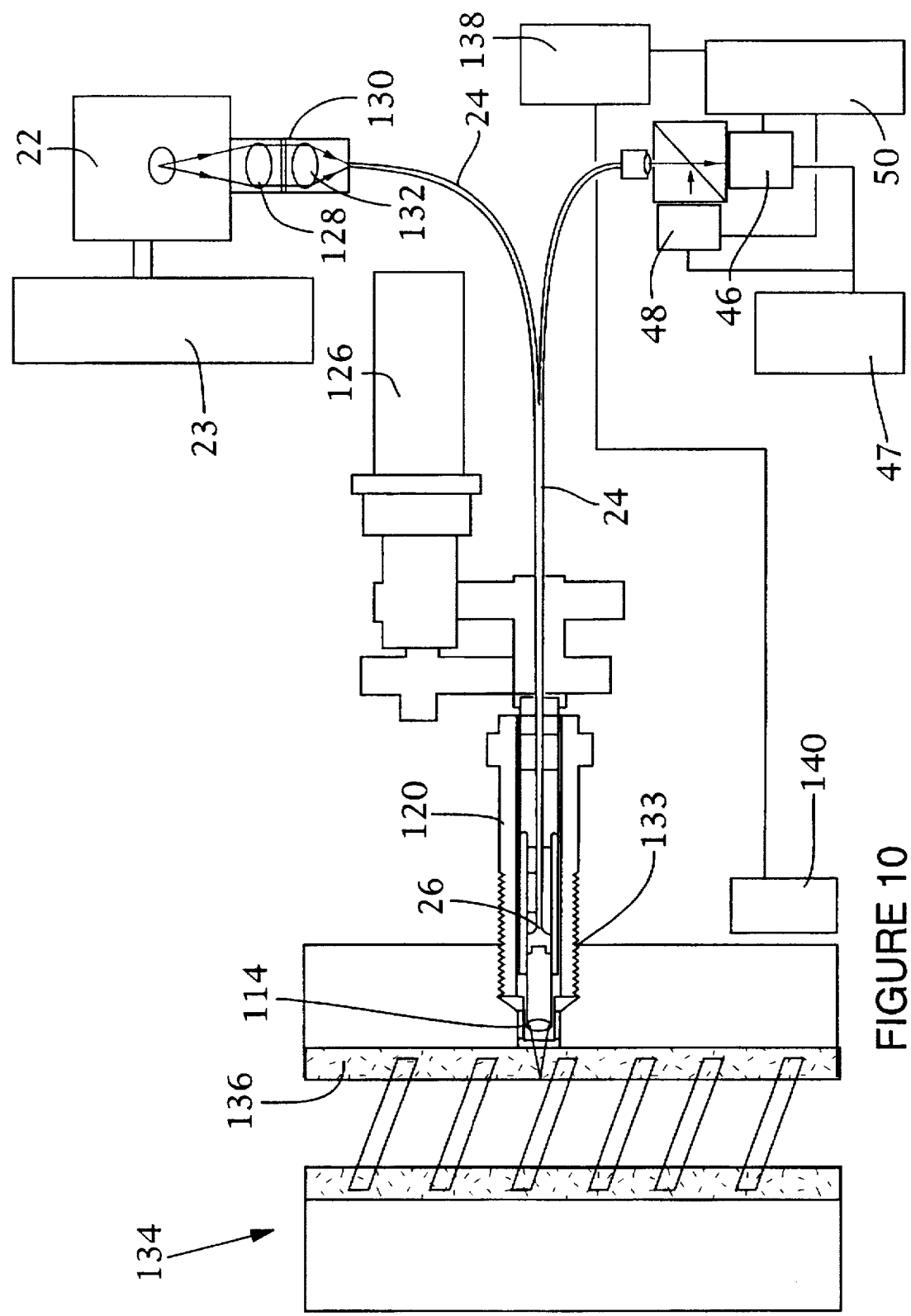
FIG. 10 is a schematic view of an apparatus in accordance with the invention.

FIG. 10 illustrates schematically a complete apparatus in accordance with the invention. The light source 22, which is preferably a xenon arc lamp, is powered by a power supply 23. Light is collimated by a condenser lens 128 and is filtered through a band-pass filter 130, which only allows transmission of excitation light of the desired wavelength. When the fluorescent dye is BPP, the excitation wavelength preferably is 350 nm; when the fluorescent dye is perylene, the excitation wavelength preferably is 410 nm. The excitation light is focused by a lens 132 into the bundled fiber optic cable 24, where it is transmitted to the common end 26 disposed within the housing 120. The housing 120 is bolted to a standard instrumentation port 133 in a screw-type extruder 134.

The excitation light is focused by a lens 114 into the molten polymer 136, where the fluorescent dye is excited and fluoresces to return light through the lens 114 and into the common end 26 of the optical fiber bundle 24. The common end 26 functions as a pinhole for a confocal optical measuring device. Light is returned to an intensity measuring device, as discussed above. In FIG. 10, the power supply 47 for the photomultiplier tubes 46, 48 is shown. Preferably, the counter 50 converts the analog signals produced by the photomultiplier tubes 46, 48 into two digital signals corresponding to the strength of the analog signal. The digital signals are processed by the computer 138, which calculates the temperature of the molten polymer.

A pressure gauge 140 for measuring the pressure within the liquid medium further communicates with the computer 138. Any suitable pressure gauge may be employed in conjunction with the invention. Preferably, the pressure gauge is placed directly opposite from the bolt 120, so that it may be as close as possible to the region of the polymeric medium to be measured. For example, a suitable pressure gauge is sold by Dynisco Instruments. Preferably, the pressure gauge outputs an electrical signal corresponding to the measured pressure. The electrical signal is converted by a converter (not shown), which outputs a digital signal. The digital signal is processed by the computer in calculating the temperature of the molten polymer. Alternatively, the reading from the pressure gauge may be manually input into the computer 138. The computer 138 may provide an output in the form of a single temperature reading, in tabular form, or in graphical form. Readings are taken as often as is necessary to follow temperatures changes in the process. For example, readings may be made at a rate of one measurement per second. Of course, much shorter acquisition times may be achieved if desired. The limiting time constant for the measurement is the fluorescence decay time, which is approximately 10 nanoseconds for these dyes.

Preferably, temperature readings are taken at a rate faster than the rotational rate of the screw. Readings for which there is no fluorescence correspond to the time at which the screw flight passes directly over the sensor bolt. By taking more than one reading per rotation of the screw, the device is able to measure a temperature profile in the axial direction, i.e., with respect to the relative position of the flights. Pressure readings preferably are taken with the same frequency as temperature readings.

Figure 11:
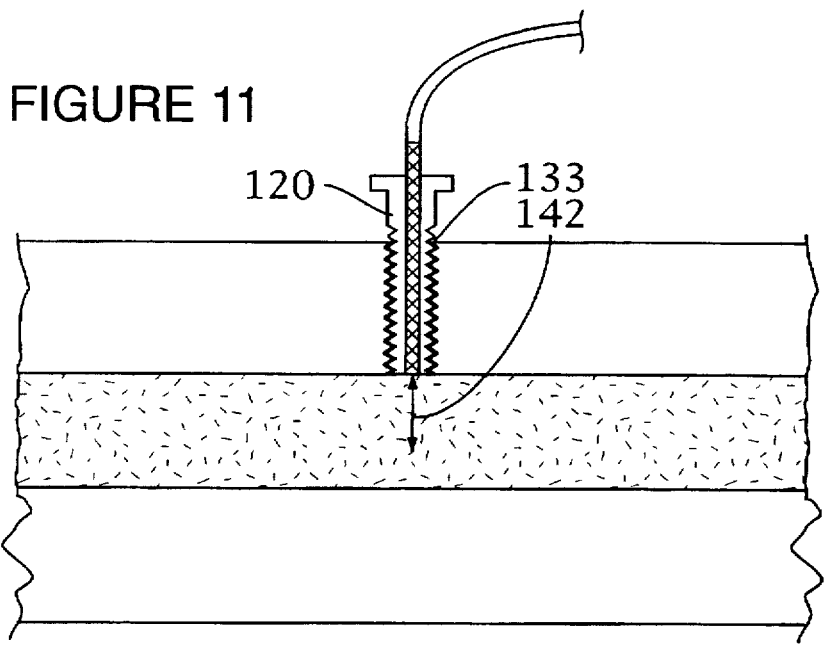
FIG. 11 is an idealized, side plan view of the apparatus of the invention, as used to measure the temperature of a molten polymer within an extruder.

FIG. 11 better illustrates the apparatus of the invention when used to measure the temperature within a channel in, for example, a polymer processing system. As shown, the housing 120 is secured within a standard instrumentation port 133. Although the housing 120 does not extend into the polymeric medium, a one-dimensional temperature profile along line 142 still may be determined.

Figure 12:
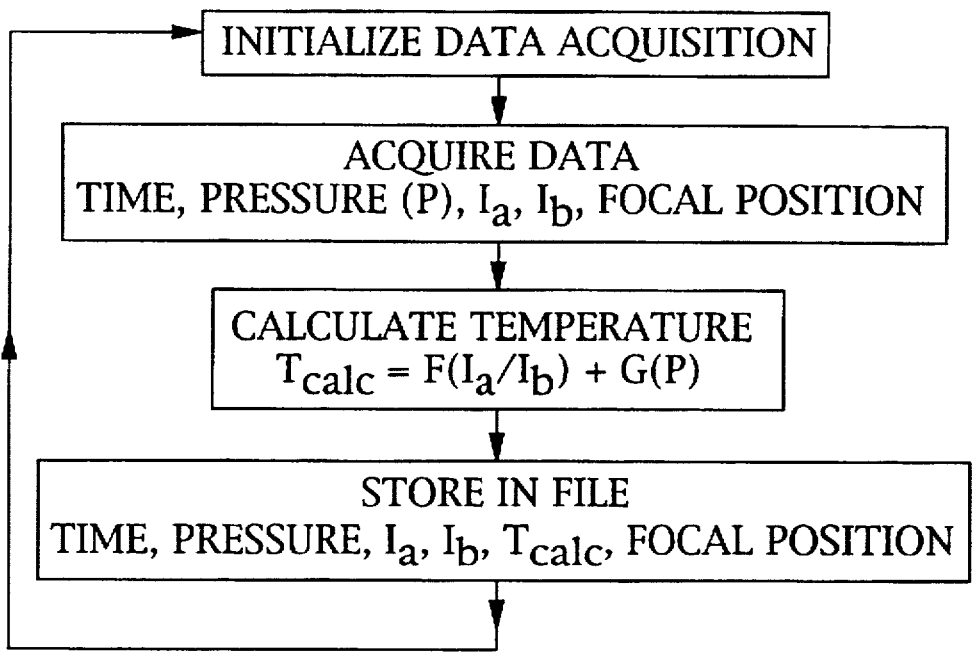
FIG. 12 is a flowchart representation of a computer software program useful in calculating the temperature of the liquid medium.

Any suitable means may be used to calculate the temperature of the liquid medium in accordance with the temperature and pressure functions. In a preferred embodiment, a computer is used. FIG. 12 is a flowchart representation of a computer program useful in calculating the temperature of a liquid medium using the apparatus of the invention. No special programming is necessary to calculate the temperature. In the Figure, the pressure and temperature functions are represented by $F(I_e/I_b)$ and $G(P)$, respectively. These functions may be entered in advance into the computer, or may be determined by the computer by calibrating the apparatus of the invention.

Figure 13:
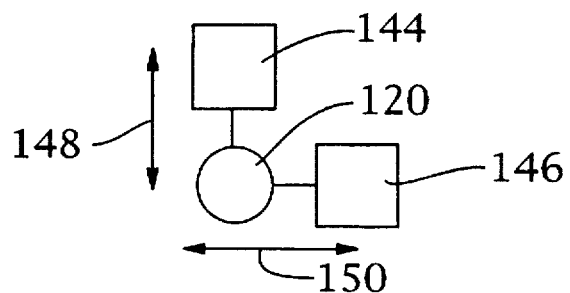
FIG. 13 is a schematic illustration of an apparatus useful in generating a three-dimensional temperature profile of a liquid medium.

In FIG. 13, an apparatus useful in determining a three-dimensional temperature profile of a liquid medium is represented schematically. Micrometers 144, 146 are used to translate the housing 120 in two axes 148, 150 perpendicular to the axis of the housing. A third micrometer (illustrated in previous Figures but not shown in FIG. 13) is used to translate endpiece-lens assembly along the axial direction of the housing. Accordingly, by employing the apparatus depicted in FIG. 13, a two- or three-dimensional temperature profile may be determined along a region of the molten polymer or other liquid medium. Any other means for translating the housing may be employed in addition to, or in lieu of, the micrometers.

The following examples further illustrate the present invention but, of course, should not be construed as in any way limiting its scope.

EXAMPLE 1

Calibration of BPP in Methacrylate/Methacrylic Acid Copolymer

To obtain the calibration curve illustrated in FIG. 2, a copolymer of 85% methyl methacrylate and 15% methacrylic acid was provided. The polymer was doped by heavily coating 200 g of resin pellets with a solution of BPP in toluene. The solvent was evaporated, leaving approximately 25 mg of BPP coated onto the resin pellets, mixed with 7 kg of uncoated pellets yielding a concentration of approximately 3.5 ppm by weight. The coated pellets were mixed with 7 kg uncoated pellets to provide a resin concentration of approximately 10 ppm by weight.

Using a temperature-controlled oven equipped with a thermocouple and bundled fiber optic cable, monomer and excimer fluorescence measurements were obtained and correlated to temperature measurements obtained from the thermocouple. The calibration curve shown in FIG. 2 was obtained, and a quadratic curve according to the following equation was fit to the data obtained:

$$I_{ex}/I_{mon} = 0.2336 - 3.33*10^{-3}T + 1.2143*10^{-5}T^2$$

EXAMPLE 2

Calibration of BPP in PDMS

To obtain the calibration curve of FIG. 3, a solution of BPP in toluene was mixed with molten PDMS, at a concentration of $5-10^{-6}$ molecules of PBB per molecule of PDMS. In a manner similar to that of Example 1, the monomer and excimer fluorescence measurements were correlated to temperature.

EXAMPLE 3

Calibration of Perylene in Polycarbonate

In a manner similar to that of Example 1, the calibration curve shown in FIG. 5 for perylene doped into polycarbonate resin was obtained. The solvent used was dichloroethylene. and the final concentration of perylene in the resin was approximately $10^{-5}$:1 (molecular ratio). A linear curve according to the following equation was fit to the data obtained:

$$I_{464}/I_{473}=0.350519+6.667*10^{-4}*T$$

EXAMPLE 4

Determination of Pressure Correction Factor

The BPP-doped resin obtained in Example 1 was extruded through a screw-type extruder equipped with an optical fiber cable. an IR radiometer, and a pressure sensor. The IR-measured temperature is believed to be unaffected by the pressure within the polymeric medium. Readings were taken at various pressures within the extruder. By comparing the IR-measured temperature to the apparent fluorescence temperature, a pressure correction factor of 2.8° C. per 6.895 MPa (1000 psi) was obtained.

EXAMPLE 5

Determination of Pressure Correction Factor

In a manner similar to that of Example 4. a pressure correction factor of 14.8° C. per 6.895 MPa (1000 psi) was obtained for perylene in polycarbonate.

EXAMPLE 6

Comparison of IR, Thermocouple, and Fluorescence Temperature Measurements

An extruder was equipped with a thermocouple. IR radiometer, and optical fiber cable. The thermocouple and optical fiber cable were located in a slit die at the end of the extruder, and the IR radiometer was located on the barrel of the extruder. The temperature of the polymer was measured as the speed of the extruder was increased from 0 to 80 rpm and back down to 0. The results are graphically illustrated in FIG. 14.

It is noted that, as measured by both the IR radiometer and the apparatus of the invention. shear heating effects caused the temperature to increase as the drive speed of the extruder was increased. As shown in the Figure, the thermocouple temperature appeared relatively constant, thus demonstrating that the thermocouple was not able to detect shear heating effects.

The invention herein has been described with reference to transparent liquid media. but is not limited thereto. For example, the invention finds utility in conjunction with molten polymers that are not transparent (for example dyed or pigmented polymers). For instance, a polymer processing machine may be calibrated with a transparent polymer, such as polyethylene. After the conditions inside the polymer processing machine have been evaluated, the transparent polymer may be removed and the polymer processing continued with a non-transparent polymer. It is further contemplated that the invention may be employed in conjunction with temperature measurement of a solid medium. such as, for example, a sheet of glass.

While particular embodiments of the invention have been shown, it will of course be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

All references cited herein are hereby incorporated by reference in their entireties.

What is claimed is:

1. A method for measuring the temperature of a liquid medium, comprising the steps of:

providing a liquid medium containing a fluorescent dye, wherein said fluorescent dye exhibits a first fluorescence intensity at a first wavelength and a second fluorescence intensity at a second wavelength, wherein the temperature of said liquid medium may be determined as in accordance with a predetermined temperature function of said first fluorescence intensity and said second fluorescence intensity;

measuring the fluorescence intensity at said first wavelength and the fluorescence intensity at said second wavelength; and determining the temperature of said liquid medium in accordance with said temperature function.

2. A method in accordance with claim 1, wherein said ratio of said first fluorescence intensity to said second fluorescence intensity further varies according to a predetermined pressure function of the pressure within said liquid medium, said method further comprising the steps of:

determining the pressure within said liquid medium; and determining a correction to the temperature determined in accordance with the temperature function further in accordance with said pressure function.

3. A method in accordance with claim 2, wherein said liquid medium is a molten polymeric medium.

4. A method in accordance with claim 1, wherein said dye is perylene.

5. A method in accordance with claim 1, wherein said dye is bis-(pyrene) propane.

6. A method in accordance with claim 1, wherein said dye is benzoxazolyl stilbene.

7. A method in accordance with claim 1, comprising the steps of:

(a) measuring the fluorescence intensity at said first wavelength and the fluorescence intensity at said second wavelength at a point within said liquid medium;

(b) determining the temperature of said liquid medium at said point in accordance with said temperature function; and (c) repeating steps (a) and (b) at least once at one or more additional points within said liquid medium to thereby determine a temperature profile of said liquid medium.

8. A method according to claim 7, wherein said steps (a) and (b) are repeated at at least three different collinear points within said liquid medium to thereby determine a one-dimensional temperature profile of said liquid medium.

9. A method according to claim 7, wherein said steps (a) and (b) are repeated at at least three different non-collinear points within said liquid medium to thereby determine a two-dimensional temperature profile of said liquid medium.

10. A method according to claim 7, wherein said steps (a) and (b) are repeated at at least four different non-coplanar points within said liquid medium to thereby determine a three-dimensional temperature profile of said liquid medium.

11. A method for measuring the temperature of a liquid medium, comprising the steps of:

providing a liquid medium containing a fluorescent dye, wherein said fluorescent dye exhibits a first fluorescence intensity at a first wavelength and a second fluorescence intensity at a second wavelength, wherein the ratio of said first fluorescence intensity to said second fluorescence intensity is variable in accordance with a predetermined temperature function of the temperature of said liquid medium, wherein both said first fluorescence intensity at said first wavelength and said second fluorescence intensity at said second wavelength vary according to the temperature of said fluorescent dye;

measuring the fluorescence intensity at said first wavelength and the fluorescence intensity at said second wavelength;

determining the ratio of said fluorescence intensity at said first wavelength to said second fluorescence intensity at said second wavelength; and determining the temperature of said liquid medium in accordance with said temperature function.

12. Apparatus for determining the temperature of a fluorescing medium, comprising:

means for measuring the fluorescence of said medium at a first fluorescence intensity and a second fluorescence intensity; and means for determining the temperature of the medium in accordance with a predetermined temperature function of said first fluorescence intensity and said second fluorescence intensity.

13. Apparatus for determining the temperature of a liquid medium that contains a fluorescent dye, comprising:

means for generating light at a wavelength sufficient to generate fluorescence from said fluorescent dye;

means for transmitting said generated light to said liquid medium;

means for focusing said generated light within said liquid medium;

means for returning light fluoresced by said liquid medium;

means for determining the intensity of returned light fluoresced by said liquid medium at a first wavelength and the intensity of returned light fluoresced by said liquid medium at a second wavelength; and means for calculating the temperature of the liquid medium as a function of the intensity of light fluoresced by said liquid medium at said first wavelength and the intensity of light fluoresced by said liquid medium at said second wavelength.

14. Apparatus in accordance with claim 13, further including means for determining the pressure within said liquid medium, wherein said means for calculating the temperature of the liquid medium additionally calculates the temperature according to a predetermined function of the pressure within the liquid medium.

15. Apparatus in accordance with claim 13, wherein said means for focusing light within said liquid medium includes means for focusing light at at least two points within said liquid medium, whereby a one-dimensional temperature profile of said liquid medium may be determined.

16. Apparatus in accordance with claim 13, wherein said means for focusing light within said liquid medium includes means for focusing light at at least three non-collinear points within said liquid medium, whereby a two-dimensional temperature profile of said liquid medium may be determined.

17. Apparatus in accordance with claim 13, wherein said means for focusing light within said liquid medium includes means for focusing light at at least four non-coplanar points within said liquid medium, whereby a three-dimensional temperature profile of said liquid medium may be determined.

18. Apparatus for determining the temperature of a liquid medium that contains a fluorescent dye, comprising:

means for generating light at a wavelength sufficient to generate fluorescence from said fluorescent dye in said liquid medium;

means for transmitting said generated light to said liquid medium;

means for focusing said generated light within said liquid medium;

means for returning light fluoresced by said liquid medium; and means for determining the intensity of returned light fluoresced by said liquid medium at a first wavelength and the intensity of returned light fluoresced by said liquid medium at a second wavelength.

19. Apparatus in accordance with claim 18, further including means for calculating the temperature of the liquid medium in accordance with a predetermined temperature function of said intensity of light fluoresced by said liquid medium at said first wavelength and said intensity of light fluoresced by said liquid medium at said second wavelength.

20. Apparatus for determining the temperature of a liquid medium that includes fluorescent dye, comprising:

a tubular housing;

a bundled optical fiber cable, said cable having one common end and first and second bifurcated ends, said common end terminating at a tip, wherein said common end is disposed within said tubular housing and may be translated axially within said tubular housing;

a light source disposed in a light-communicating relationship with said first bifurcated end, whereby light may be transmitted within said optical fiber cable and through said tubular housing;

a lens disposed within said tubular housing for focusing light at a point within said liquid medium and for focusing light fluoresced by said fluorescent dye into said tubular housing; and means for measuring first and second fluorescent intensities of said light fluoresced by said liquid medium, said means disposed in a light-communicating relationship with said second bifurcated end, whereby said light fluoresced by said fluorescent dye is transmitted by said optical fiber cable to said measuring means.

21. Apparatus in accordance with claim 20, further including means for calculating the temperature of said liquid medium in accordance with a predetermined function of said first and second fluorescent intensities.

22. Apparatus in accordance with claim 20, wherein said tubular housing is in the form of a threaded bolt.

23. Apparatus in accordance with claim 20, wherein said measuring means comprises:

a beam splitter for separating the returned beam of light into first and second beams of light; and first and second photomultiplier tubes for receiving said first and second beams of light, respectively, said first photomultiplier tube supplying a signal corresponding to the intensity of the first beam of light at said first wavelength and a signal corresponding to the intensity of the second beam of light at said second wavelength;

a photon counter for digitizing said signals; and a computer for processing said digitized signals.

* * * * *